US010011367B2

(12) United States Patent
Dillon

(10) Patent No.: US 10,011,367 B2
(45) Date of Patent: Jul. 3, 2018

(54) MEASUREMENT OF ROTOR BLADE FLAPPING

(71) Applicant: Bell Helicopter Textron Inc., Fort Worth, TX (US)

(72) Inventor: John A. Dillon, Arlington, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 1468 days.

(21) Appl. No.: 13/855,789

(22) Filed: Apr. 3, 2013

(65) Prior Publication Data

US 2014/0271188 A1   Sep. 18, 2014

Related U.S. Application Data

(60) Provisional application No. 61/782,463, filed on Mar. 14, 2013.

(51) Int. Cl.
| | |
|---|---|
| *B64D 45/00* | (2006.01) |
| *B64C 27/00* | (2006.01) |
| *G01M 5/00* | (2006.01) |
| *B64F 5/00* | (2017.01) |
| *B64F 5/60* | (2017.01) |

(52) U.S. Cl.
CPC ............ *B64D 45/00* (2013.01); *B64C 27/008* (2013.01); *B64F 5/60* (2017.01); *G01M 5/0016* (2013.01)

(58) Field of Classification Search
CPC ........... B64C 27/008; B64C 2027/004; B64C 2027/005; B64C 27/001; B64C 27/10; B64D 45/00; B64F 5/0045; G01M 5/0016; F16F 7/1005

USPC ............ 416/61, 24, 104; 188/378; 267/136; 244/17.3, 17.13
See application file for complete search history.

(56) References Cited

U.S. PATENT DOCUMENTS

| | | | | |
|---|---|---|---|---|
| 4,297,076 A | * | 10/1981 | Donham | F03D 7/0228 416/24 |
| 4,583,862 A | | 4/1986 | Ferrar et al. | |
| 4,930,988 A | * | 6/1990 | Griffith | B64C 27/72 416/114 |
| 6,135,713 A | * | 10/2000 | Domzalski | B64C 27/001 416/104 |

(Continued)

FOREIGN PATENT DOCUMENTS

| | | |
|---|---|---|
| GB | 2438315 A | 11/2007 |
| JP | 2005238944 A | 9/2005 |

(Continued)

OTHER PUBLICATIONS

Search Report in related European Application No. 14150079.3, dated Aug. 8, 2014, 3 pages.

(Continued)

*Primary Examiner* — Mark Laurenzi
*Assistant Examiner* — Paul Thiede
(74) *Attorney, Agent, or Firm* — Lightfoot & Alford PLLC

(57) ABSTRACT

According to one embodiment, a flapping measurement system may include a position sensor and a controller. The position sensor may be disposed on the flapping plane of a rotor blade and operable to provide position measurements identifying locations of the position sensor during operation of the rotor blade. The controller may be operable to identify flapping of the rotor blade based on the position measurements.

20 Claims, 4 Drawing Sheets

(56) References Cited

U.S. PATENT DOCUMENTS

| | | | |
|---|---|---|---|
| 6,279,704 B1 * | 8/2001 | Manfredotti | B64C 27/001 188/378 |
| 6,679,119 B2 * | 1/2004 | Board | G01H 1/003 702/56 |
| 7,083,142 B2 * | 8/2006 | Scott | B64C 27/10 244/17.13 |
| 2012/0212712 A1 * | 8/2012 | Scanlon | G03B 21/562 353/121 |

FOREIGN PATENT DOCUMENTS

| | | |
|---|---|---|
| JP | 2010149602 A | 7/2010 |
| KR | 100946639 B1 | 3/2010 |

OTHER PUBLICATIONS

Examination Report in related European Application No. 14150079.3, dated Aug. 21, 2014, 6 pages.
Communication Under Rule 71(3) EPC in related European Application No. 14150079.3, dated Sep. 2, 2015, 27 pages.

\* cited by examiner

MEASUREMENT OF ROTOR BLADE FLAPPING

RELATED APPLICATIONS

Pursuant to 35 U.S.C. § 119 (e), this application claims priority to U.S. Provisional Patent Application Ser. No. 61/753,256, entitled MEASUREMENT OF ROTOR BLADE FLAPPING, filed Jan. 16, 2013. U.S. Provisional Patent Application Ser. No. 61/753,256 is hereby incorporated by reference.

TECHNICAL FIELD

This invention relates generally to rotor systems, and more particularly, to measurement of rotor blade flapping.

BACKGROUND

A rotorcraft may include one or more rotor systems. One example of a rotorcraft rotor system is a main rotor system. A main rotor system may generate aerodynamic lift to support the weight of the rotorcraft in flight and thrust to counteract aerodynamic drag and move the rotorcraft in forward flight. Another example of a rotorcraft rotor system is a tail rotor system. A tail rotor system may generate thrust in the same direction as the main rotor system's rotation to counter the torque effect created by the main rotor system. A rotor system may include one or more pitch links to rotate, deflect, and/or adjust rotor blades.

SUMMARY

Particular embodiments of the present disclosure may provide one or more technical advantages. A technical advantage of one embodiment may include the capability to measure flapping of a rotor blade. A technical advantage of one embodiment may include the capability to improve flapping measurement accuracy. A technical advantage of one embodiment may include the capability to provide time-stamped measurements of rotor blade flapping. A technical advantage of one embodiment may include the capability to correlate rotor blade flapping measurements with blade rotation position.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE DRAWINGS

Figure 1:
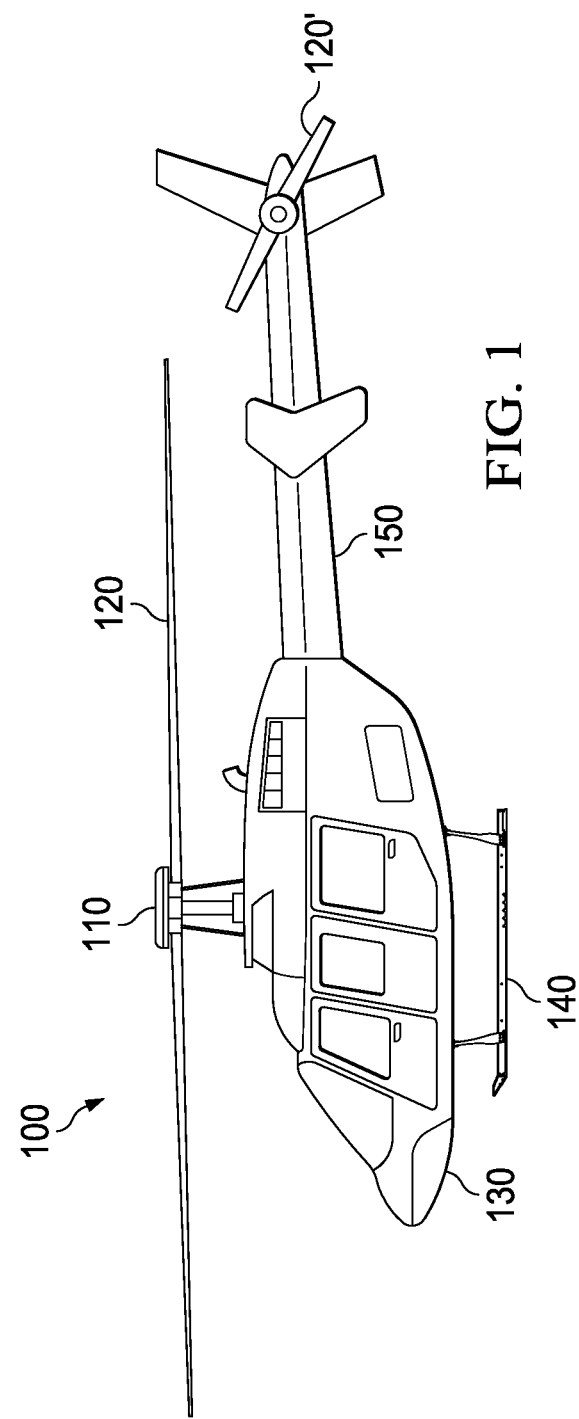
FIG. 1 shows a rotorcraft according to one example embodiment.

FIG. 1 shows a rotorcraft 100 according to one example embodiment. Rotorcraft 100 features a rotor system 110, blades 120, a fuselage 130, a landing gear 140, and an empennage 150. Rotor system 110 may rotate blades 120. Rotor system 110 may include a control system for selectively controlling the pitch of each blade 120 in order to selectively control direction, thrust, and lift of rotorcraft 100. Fuselage 130 represents the body of rotorcraft 100 and may be coupled to rotor system 110 such that rotor system 110 and blades 120 may move fuselage 130 through the air. Landing gear 140 supports rotorcraft 100 when rotorcraft 100 is landing and/or when rotorcraft 100 is at rest on the ground. Empennage 150 represents the tail section of the aircraft and features components of a rotor system 110 and blades 120'. Blades 120' may provide thrust in the same direction as the rotation of blades 120 so as to counter the torque effect created by rotor system 110 and blades 120. Teachings of certain embodiments relating to rotor systems described herein may apply to rotor system 110 and/or other rotor systems, such as other tilt rotor and helicopter rotor systems. It should also be appreciated that teachings from rotorcraft 100 may apply to aircraft other than rotorcraft, such as airplanes and unmanned aircraft, to name a few examples.

Figure 2:
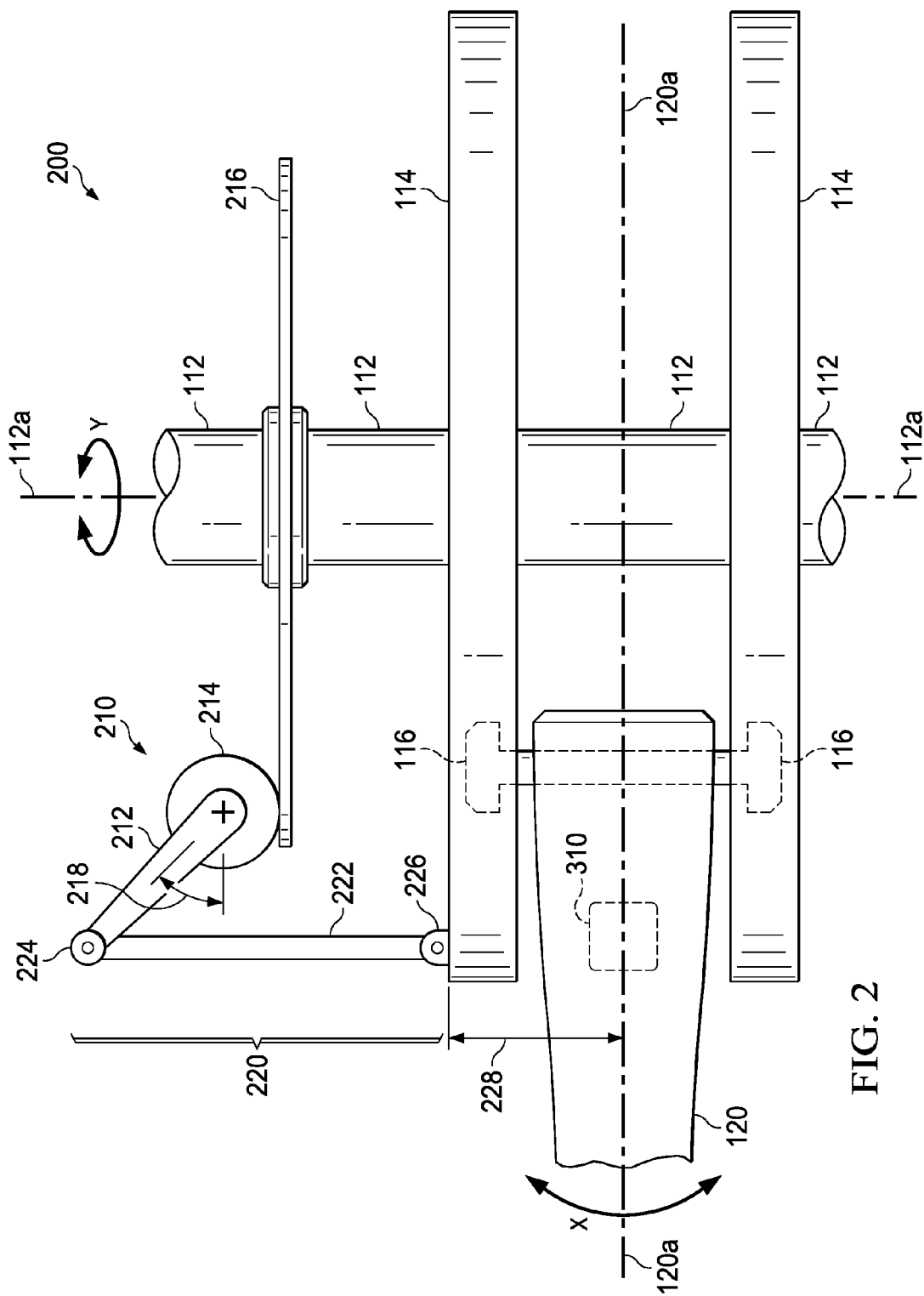
FIG. 2 shows a mechanical flapping measurement system installed on the rotor system of FIG. 1 according to one example embodiment.

FIG. 2 shows the rotor system 110 of FIG. 1 according to one example embodiment. In the example of FIG. 2, rotor system 110 features a shaft 112, a hub, 114, and a pin 116. Hub 114 and pins 116 may couple blades 120 to shaft 112. In some examples, rotor system 110 may include more or fewer components. For example, FIG. 2 does not show components such as a power train, a gearbox, a swash plate, grips, drive links, drive levers, and other components that may be incorporated.

The power train, shaft 112, and hub 114 may represent examples of mechanical components for generating and transmitting torque and rotation. The power train may include a variety of components, including an engine, a transmission, and differentials. In operation, shaft 112 receives torque or rotational energy from the power train and rotates hub 114 about rotor axis 112a. Blades 120 are coupled to hub 114 by pins 116. Rotation of hub 114 causes blades 120 to rotate about shaft 112.

Blades 120 may be subject to a variety of different forces. For example, rotation of blades 120 may result in a centrifugal (CF) force against grips blades 120 in a direction away from shaft 112. In addition, the weight of blades 120 may result in a transverse force being applied against hub 114. These and other forces may cause blades 120 to feather, drag (also known as lead/lag), and flap during operation of rotorcraft 100. The remainder of the discussion below will primarily focus on blade flapping.

Blade flapping may generally refer to up-and-down motion of a rotor blade during operation. In the example of FIG. 2, blade 120 is shown at a zero-degree flapping angle. In this example, blade 120 is centered on flapping-plane centerline 120a. When flapping occurs, blade 120 deviates upwards or downwards from flapping-plane centerline 120a, resulting in a flapping angle between flapping-plane centerline 120a and the flapping-plane of the blade.

Blade flapping may be caused by the changing speeds of a rotor blade during one rotation. For a single-rotor aircraft, the rotor disc may be divided into two sides: the advancing blade side and the retreating blade side. On the advancing blade side, rotation of the rotor blade causes the rotor blade to move in the same direction as forward flight of the aircraft. On the retreating side, rotation of the rotor blade causes the rotor blade to move in the opposite direction of forward flight of the aircraft.

An advancing blade, upon meeting the progressively higher airspeeds brought about by the addition of forward flight velocity to the rotational airspeed of the rotor, respond to the increase of speed by producing more lift. This increased production of lift causes the blade to flap (or lift) upwards. For a retreating blade, the opposite is true. The retreating blade responds to the progressively lower airspeeds by producing less lift. This decreased production of lift causes the blade to flap downwards.

In some examples, blade flapping may help compensate for dissymmetry of lift. Dissymmetry of lift may refer to an uneven amount of lift on opposite sides of a rotor disc. Blade flapping may compensate for dissymmetry of lift by decreasing the relative angle of attack of an advancing blade and increasing the relative angle of attack of a retreating blade.

Thus, some rotor systems may be designed to allow some rotor blade flapping. For example, a fully-articulated rotor system may include horizontal hinges that allow rotor blades to flap during operation. Excess flapping, however, may cause damage to the rotor system if the flapping angle exceeds recommended limits. Accordingly, teachings of certain embodiments recognize the capability to measure flapping of a rotor blade during operation of the aircraft. In addition, the magnitude of such damage may be a function of time or number of rotations (even a small increase in flapping angle can cause damage if the increased flapping angle is sustained over a long duration or a high number of rotations). Accordingly, teachings of certain embodiments recognize the capability to time-stamp or rotation-stamp rotor blade flapping measurements. Furthermore, rotor system inertia may result in a phase delay between maximum advancing blade speed (which one would expect to occur when the rotor blade is positioned perpendicular to the body of the aircraft) and maximum flapping angle (which one would expect to occur at some point after maximum advancing blade speed is reached). Accordingly, teachings of certain embodiments recognize the capability to correlate rotor blade flapping measurements with blade rotation position, which may allow for calculation of the phase delay and other aspects of rotor blade flapping.

FIG. 2 shows a mechanical flapping measurement system 200 installed on rotor system 110 according to one example embodiment. Flapping measurement system 200 features a measurement system 210 and a linkage assembly 220. Linkage assembly 220 couples measurement system 210 to hub 114 such that measurement system 210 may measure flapping of blade 120 by measuring movement of hub 114 as a result of blade flapping.

In the example of FIG. 2, measurement system 210 features a shaft 212, a rotary variable differential transformer (RVDT) 214, and a platform 216. An RVDT is a type of electrical transformer operable to measure angular displacement. Platform 216 supports RVDT 214 and couples RVDT 214 to shaft 112. Also in the example of FIG. 2, linkage system 220 features a linkage 222 and pivot bearings 224 and 226. Pivot bearing 224 couples linkage 222 to shaft 212, and pivot bearing 226 couples linkage 222 to hub 114.

During operation, according to one example embodiment, flapping of blade 120 causes upward or downward movement of hub 114. Upward or downward movement of hub 114 causes linkage 222 to move the tip of shaft 212 upward or downward. Moving the tip of shaft 212 increases or decreases angle 218, which may be measured by RVDT 214. In some embodiments, a nominal angle 218 may be defined for a zero-flapping position of blade 120, and the flapping angle of blade 120 may be measured by reference to the nominal angle.

Although the mechanical flapping measurement system 200 of FIG. 2 can provide a measurement indicative of rotor blade flapping, system 200 may be prone to a variety of measurement errors. For example, RVDT 214 is configured in system 200 to rotate with shaft 112 during operation, but rotating RVDT 214 can cause electrical phase shifts that affect signal demodulation. In addition, system 200 may be prone to errors caused by mechanical misalignments, mechanical crosstalk affecting the lateral and longitudinal sensor sample positions, and rotor hub compression. As one example, system 200 may be prone to measurement errors due to the offset 228 between the flapping plane of blade 228 and pivot bearing 226. In the example of FIG. 2, system 200 does not directly measure flapping of blade 120; rather, system 200 attempts to measure movement of hub 114 at pivot bearing 226 and then estimate flapping of blade 120 based on movement of pivot bearing 226.

Furthermore, measurements provided by system 200 may be of limited value. For example, system 200 as shown in FIG. 2 does not include mechanisms for time stamping or for correlating measurements with blade rotation position. Thus, even if system 200 could accurately measure blade flapping angle, for example, system 200 may not be able to calculate blade flapping velocities, accelerations, or phase shifts.

As will be explained in greater detail below, teachings of certain embodiments recognize the capability to eliminate or reduce inaccuracies due to mechanical linkages and electrical phase shifts by providing a position sensor in the rotor blade. For example, providing a position sensor, such as a microelectromechanical system (MEMS) position sensor, in a rotor blade, such as on the flapping plane of the rotor blade, may reduce or eliminate mechanical and electrical errors. Furthermore, teachings of certain embodiments recognize the capability to provide time stamping and/or blade rotation position information with flapping measurements.

Figure 3:
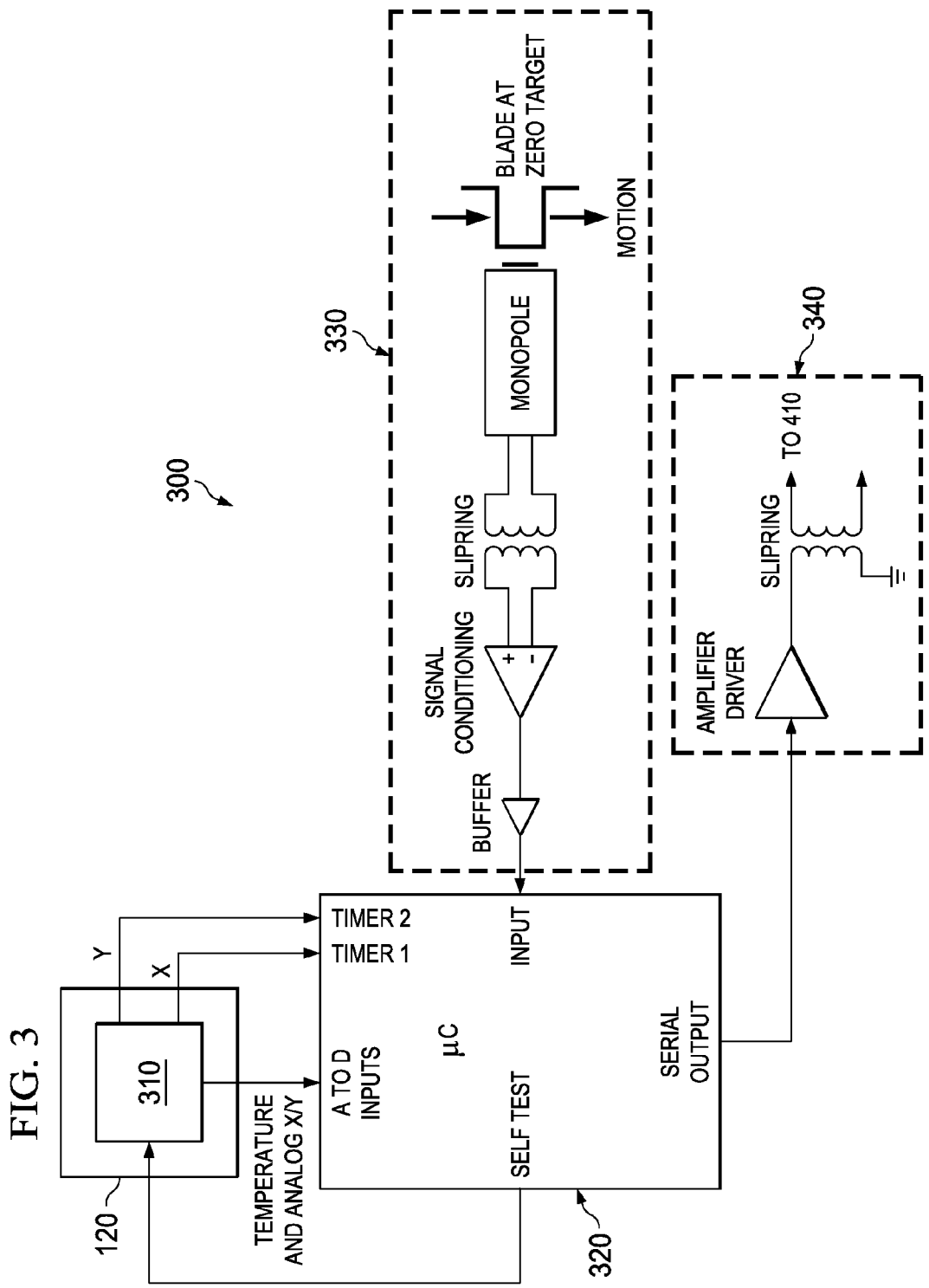
FIG. 3 shows a flapping sensor system that may measure flapping of a blade of the rotorcraft of FIG. 1 according to one example embodiment.

FIG. 3 shows a flapping sensor system 300 according to one example embodiment. Flapping sensor system 300 features a position sensor 310, a measurement engine 320, an index detector 330, and a transceiver 340.

Position sensor 310 provides measurements of identifying locations of position sensor 310 over time. As seen in the example of FIG. 2, position sensor 310 may be located on the flapping plane of the blade such that position sensor 310 provides measurements identifying the locations of the flapping plane of the blade over time. In some embodiments, position sensor 310 may provide location measurements in three dimensions, such as along the flapping axis (X), the rotational axis (Y), and the gravitational axis (Z). Movement in the X and Y axis may be seen in the example of FIG. 2. In some embodiments, position sensor 310 is operable to provide velocity and acceleration information as well as position information. This velocity and acceleration information may be used, for example, to determine flapping velocity and acceleration as well as correlate such measurements to blade velocity and acceleration. For example, the phase delay between maximum advancing blade speed and maximum flapping angle, as well as other information, may be determined from the position, velocity, and acceleration measurements provided by position sensor 310.

In some embodiments, position sensor 310 is a MEMS device. MEMS is a technology associated with very small devices, merging at the nano-scale into nanoelectromechanical systems (NEMS) and nanotechnology. MEMS may also be referred to as micromachines. In some embodiments, MEMS devices may generally range in size from 20 micrometers to one millimeter and may be made up of components between 1 and 100 micrometers in size. Teachings of certain embodiments recognize that devices such as MEMS devices may be directly secured to/on a rotor blade without affecting weight, balance, and other performance characteristics of the rotor blade.

Measurement engine 320 may identify flapping based on measurements provided by position sensor 310. In some embodiments, measurement engine 320 may identify flapping based on a comparison of the received measurements from position sensor 310 to a known zero-flapping index position of a rotor blade. The zero-flapping index position of a rotor blade may represent what the position measurements from position sensor 310 should be when the rotor blade is at zero-degree flapping angle. A blade 120 may be at zero-degree flapping angle, for example, when blade 120 is centered on flapping-plane centerline 120a, which may lie on the zero-flapping plane of blade 120.

Measurement engine 320 may identify flapping of a rotor blade based on differences between measurements provided by position sensor 310 and the zero-flapping index position of the rotor blade. For example, measurement engine 320 may calculate a flapping angle of the rotor blade based on the comparison. For example, measurement engine 320 may calculate the flapping angle by comparing three-dimension position measurements form position sensor 310 to a zero-flapping coordinate system, which may be at least partially defined by the zero-flapping plane and/or the flapping-plane centerline 120a of blade 120.

Index detector 330 may provide a variety of different indexing information. In one example embodiment, index detector 330 may provide information regarding the zero-flapping index position of a rotor blade. For example, index detector 330 may include a monopole sensor that detects when the rotor blade is at zero-degrees flapping. In this example, measurement engine 320 may determine a zero-flapping index position based on the position measurements provided by position sensor 310 corresponding to times when index detector 330 determines that the rotor blade is at zero-degrees flapping. Measurement engine 320 may then determine rotor blade flapping angles by comparing measurements provided by position sensor 310 to the determined zero-flapping index position.

In another example embodiment, index detector 330 may provide information regarding the blade rotation position of a rotor blade. For example, in one embodiment, index detector 330 may include a monopole sensor that detects when the rotor blade is at a fixed zero-degree rotor blade position. For example, the monopole sensor may be mounted on the rotating portion of rotor system 110 (such as shaft 112 or another rotating component) and identify every time the rotating portion passes a fixed, stationary position on rotorcraft 100 corresponding to the fixed zero-degree rotor blade position. Alternatively, as another example, the monopole sensor may be located at the stationary position and detect every time a certain part of the rotation portion passes.

In these examples, index detector 330 may provide time-stamped information identifying when the rotor blade is at the fixed zero-degree rotor blade position. This fixed zero-degree rotor blade position may represent a known location, such as a position directly over the nose of the aircraft, directly over the tail of the aircraft, or any known points in between. Measurement engine 320 may correlate this time-stamped information from index detector 330 with time-stamped measurements provided by position sensor 310. Measurement engine 320 may identify, for example, measurements from position sensor 310 corresponding to when the rotor blade is located at the fixed zero-degree rotor blade position. In addition, measurement engine 320 may identify measurements from position sensor 310 corresponding to other blade rotation positions. For example, measurement engine 320 may estimate other blade rotation positions based on the amount of time elapsed between when the rotor blade passes the fixed zero-degree rotor blade position. As another example, measurement engine 320 may estimate other blade rotation positions using velocity and acceleration information provided by position sensor 310.

In some embodiments, index detector 330 may feature multiple monopole sensors (or other sensors) to provide more accurate blade rotation position information. Accurate blade rotation position information may allow measurement engine 320 to determine, for example, lead-lag of the rotor blade by comparing differences between rotor shaft position (as determined by index detector 330) and rotor blade position (as determined by position sensor 310).

Accordingly, teachings of certain embodiments recognize that position sensor 310 and index detector 330 may allow measurement engine 320 to provide a variety of outputs. For example, in some embodiments, measurement engine 320 may provide a time-stamped flapping log for a rotor blade. This time-stamped flapping log may include, for example, the rotor blade flapping angle, flapping velocity, flapping acceleration, and blade rotation position of the rotor blade at each time entry. Measurement engine 320 may provide this and other output through a transceiver 340.

Figure 4:
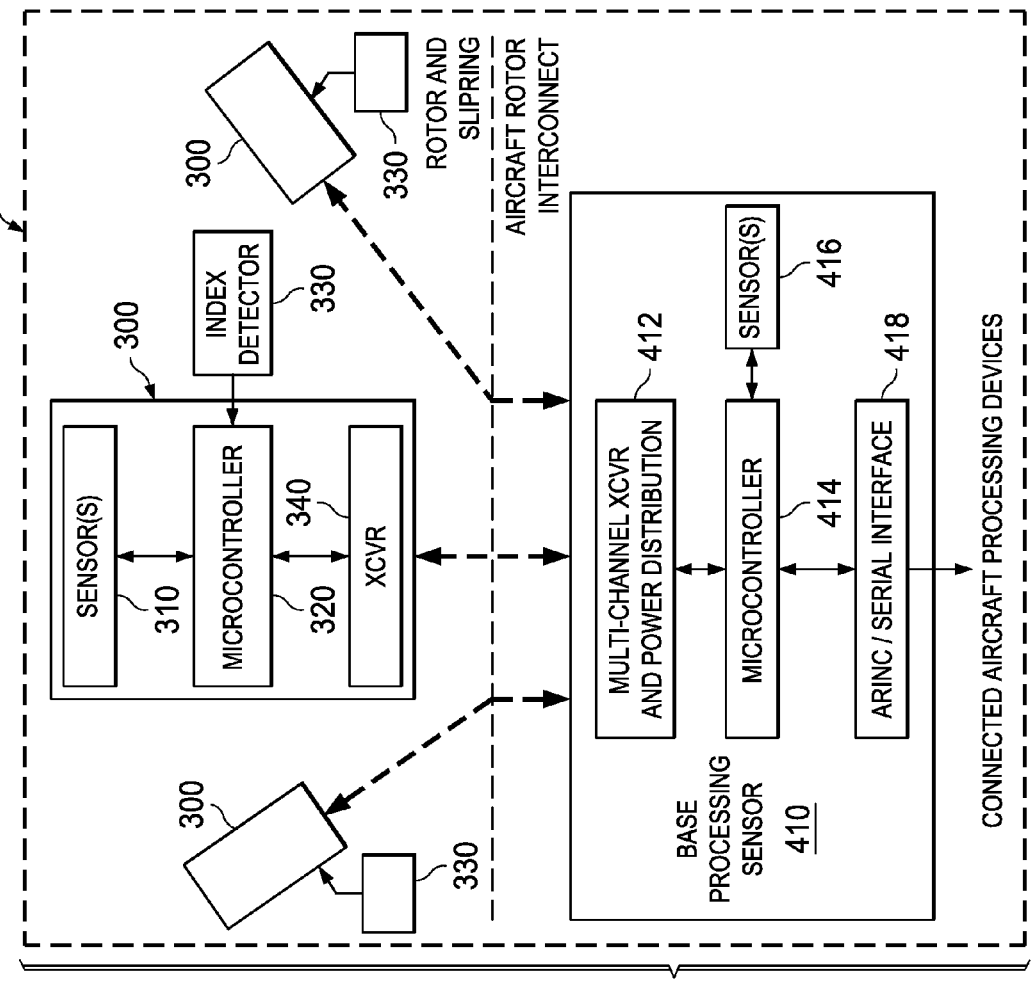
FIG. 4 shows a flapping measurement system featuring several of the flapping sensor systems of FIG. 3 according to one example embodiment.
Figure 4:
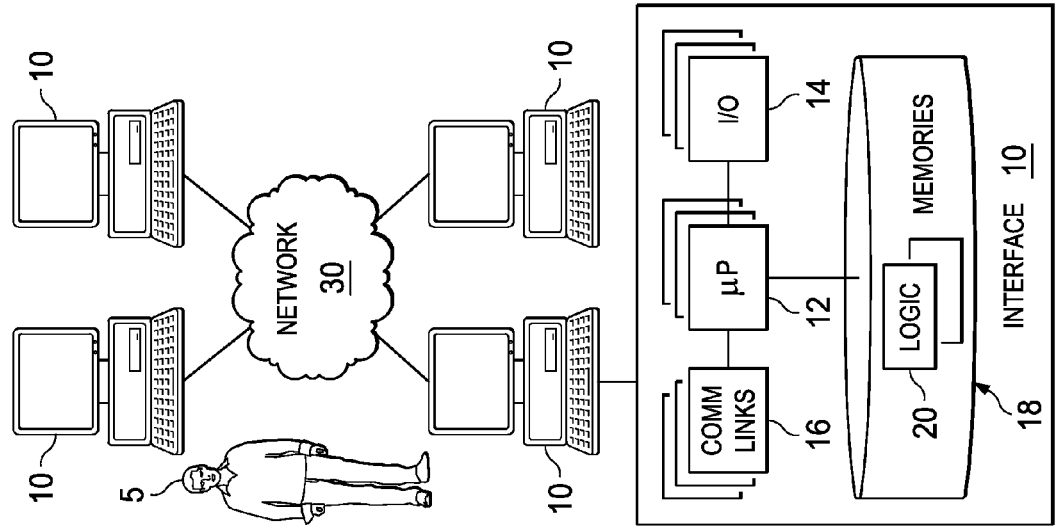

FIG. 4 shows a flapping measurement system 400 according to one example embodiment. Flapping measurement system 400 features multiple flapping sensor systems 300 in communication with a base processing sensor 410, all or some of which may be implemented by one or more computer systems 10 and all or some of which may be accessed by a user 5.

In some embodiments, each flapping sensor system 300 may be associated with one rotor blade, and the base processing sensor 410 may be associated with one rotorcraft. All, some, or none of the components of system 400 may be located on or near an aircraft such as rotorcraft 100. For example, in one example embodiment, flapping sensor systems 300 may be located in the rotating portion of rotorcraft 100 (e.g., the rotating portion of rotor system 110), and base processing sensor 410 may be located on the stationary portion of rotorcraft 100. In this example, flapping sensor systems 300 may be separated from base processing sensor 410 by a slip ring and may communicate with base processing sensor 410 using an aircraft rotor interconnect.

In the example of FIG. 4, base processing sensor 410 features a transceiver 412, a measurement engine 414, a position sensor 416, and an interface 418.

Transceiver 412 may receive measurements from flapping sensor systems 300. In some embodiments, transceiver 412 may include a multi-channel transceiver for receiving measurements from multiple flapping sensor systems 300. In addition, transceiver 412 may include a power distribution system for powering flapping sensor systems 300.

Measurement engine 414 receives and processes measurements from flapping sensor systems 300. In one example embodiment, measurement engine 414 adjusts the received measurements based on data provided by position sensor 416. Position sensor 416 may provide position, velocity, acceleration, and other information about a fixed portion of rotorcraft 100. In one example embodiment, position sensor 416 may be mounted in the nacelle of rotorcraft 100 (either together with or separate from other components of system 400). Position sensor 416 may provide inertial reference information that allows sensor 400 to detect nacelle tilt and establish a platform reference for the measurements received from flapping sensor systems 300.

Measurement engine 414 may transmit flapping and other data to devices on or off rotorcraft 100 using transceiver 418. Transceiver 418 may transmit data, for example, to remote processing units such as flight control computers via a ARINC bus protocol or a serial data link. In some embodiments, measurement engine 414 may provide real-time warnings to the pilot that rotor blade flapping is too high (e.g., if rotor blade flapping angles, velocities, and/or accelerations exceed predetermined thresholds). In some embodiments, measurement engine 414 may transmit data to aircraft health monitoring systems that analyze health of the rotor blades, the rotor system, the airframe, and other rotorcraft components. The aircraft health monitoring systems may assess, for example, whether rotorcraft components should be replaced based on vibration data provided from measurement engine 414.

As stated above, all or some of flapping sensor systems 300 and base processing sensor 410 may be implemented by one or more computer systems 10 and may be accessed by a user 5. For example, in some embodiments, user 5 may access measurements provided by flapping sensor systems 300 and/or base processing sensor 410. As another example, user 5 may program, modify, and/or upgrade flapping systems 300 and/or base processing sensor 418 through computer systems 10 and/or network 30.

Examples of users 5 include, but are not limited to, a pilot, service person, engineer, technician, contractor, agent, and/or employee. Users 5 may be associated with an organization. An organization may include any social arrangement that pursues collective goals. One example of an organization is a business. A business is an organization designed to provide goods or services, or both, to consumers, governmental entities, and/or other businesses.

Computer system 10 may include processors 12, input/output devices 14, communications links 16, and memory 18. In other embodiments, computer system 10 may include more, less, or other components. Computer system 10 may be operable to perform one or more operations of various embodiments. Although the embodiment shown provides one example of computer system 10 that may be used with other embodiments, such other embodiments may utilize computers other than computer system 10. Additionally, embodiments may also employ multiple computer systems 10 or other computers networked together in one or more public and/or private computer networks, such as one or more networks 30.

Processors 12 represent devices operable to execute logic contained within a medium. Examples of processor 12 include one or more microprocessors, one or more applications, and/or other logic. Computer system 10 may include one or multiple processors 12.

Input/output devices 14 may include any device or interface operable to enable communication between computer system 10 and external components, including communication with a user or another system. Example input/output devices 14 may include, but are not limited to, a mouse, keyboard, display, and printer.

Network interfaces 16 are operable to facilitate communication between computer system 10 and another element of a network, such as other computer systems 10. Network interfaces 16 may connect to any number and combination of wireline and/or wireless networks suitable for data transmission, including transmission of communications. Network interfaces 16 may, for example, communicate audio and/or video signals, messages, internet protocol packets, frame relay frames, asynchronous transfer mode cells, and/or other suitable data between network addresses. Network interfaces 16 connect to a computer network or a variety of other communicative platforms including, but not limited to, a public switched telephone network (PSTN); a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable network interfaces; or any combination of the preceding.

Memory 18 represents any suitable storage mechanism and may store any data for use by computer system 10. Memory 18 may comprise one or more tangible, computer-readable, and/or computer-executable storage medium. Examples of memory 18 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

In some embodiments, memory 18 stores logic 20. Logic 20 facilitates operation of computer system 10. Logic 20 may include hardware, software, and/or other logic. Logic 20 may be encoded in one or more tangible, non-transitory media and may perform operations when executed by a computer. Logic 20 may include a computer program, software, computer executable instructions, and/or instructions capable of being executed by computer system 10. Example logic 20 may include any of the well-known OS2, UNIX, Mac-OS, Linux, and Windows Operating Systems or other operating systems. In particular embodiments, the operations of the embodiments may be performed by one or more computer readable media storing, embodied with, and/or encoded with a computer program and/or having a stored and/or an encoded computer program. Logic 20 may also be embedded within any other suitable medium without departing from the scope of the invention.

Various communications between computers 10 or components of computers 10 may occur across a network, such as network 30. Network 30 may represent any number and combination of wireline and/or wireless networks suitable for data transmission. Network 30 may, for example, communicate internet protocol packets, frame relay frames, asynchronous transfer mode cells, and/or other suitable data between network addresses. Network 30 may include a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable communication links; or any combination of the preceding. Although the illustrated embodiment shows one network 30, teachings of certain embodiments recognize that more or fewer networks may be used and that not all elements may communicate via a network. Teachings of certain embodiments also recognize that communications over a network is one example of a mechanism for communicating between parties, and any suitable mechanism may be used.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

What is claimed is:

1. A rotorcraft, comprising:
    a body;
    a power train coupled to the body and comprising a power source and a drive shaft coupled to the power source;
    a hub coupled to the drive shaft;
    a rotor blade coupled to the hub; and
    a flapping measurement system comprising:
        a position sensor disposed in the rotor blade and operable to provide position measurements identifying locations of the position sensor during operation of the rotorcraft; and
        a controller operable to identify flapping of the rotor blade based on a comparison of the position measurements relative to an index position of the position sensor;
        wherein the rotor blade is articulated relative to the hub to allow the rotor blade to flap.

2. The rotorcraft of claim 1, wherein the position sensor is disposed on the flapping plane of the rotor blade.

3. The rotorcraft of claim 1, wherein the index position is a zero-flapping index position and wherein the controller is operable to identify flapping of the rotor blade based on a comparison of the position measurements to the zero-flapping index position.

4. The rotorcraft of claim 3, wherein the controller is operable to identify a flapping angle of the rotor blade based on the comparison.

5. The rotorcraft of claim 2, the flapping measurement system further comprising an index detector operable to identify to the controller when the rotor blade is at a zero-flapping position, the controller operable to determine the zero-flapping index position based on the identification provided by the index detector.

6. The rotorcraft of claim 5, the controller operable to determine the zero-flapping index position based on the position measurements provided by the position sensor corresponding to times when the rotor blade is at the zero-flapping position.

7. The rotorcraft of claim 6, wherein the index detector comprises a monopole sensor.

8. The rotorcraft of claim 1, the flapping measurement system further comprising an index detector operable to identify to the controller when the rotor blade is at a zero-degree rotor blade position during rotation of the rotor blade, the controller operable to determine blade rotation positions of the rotor blade based on the identification provided by the index detector.

9. The rotorcraft of claim 1, wherein the position sensor is further operable to provide acceleration measurements identifying accelerations and decelerations of the position sensor during operation of the rotorcraft.

10. The rotorcraft of claim 1, wherein the position sensor is a microelectromechanical system (MEMS) device.

11. A method for measuring flapping of a rotor blade, comprising:
    providing articulation of the rotor blade relative to a hub to allow flapping;
    receiving position measurements from a position sensor disposed in the rotor blade, the position measurements identifying locations of the position sensor during operation of the rotor blade;
    comparing the received position measurements to a zero-flapping index position; and
    measuring flapping of the rotor blade based on a calculated difference between the received position measurements and the zero-flapping index position.

12. The method of claim 11, wherein the zero-flapping index position is a position representative of the zero-flapping plane of the rotor blade.

13. The method of claim 12, wherein measuring flapping of the rotor blade comprises calculating a flapping angle of the rotor blade relative to the zero-flapping plane of the rotor blade.

14. The method of claim 11, further comprising:
    receiving acceleration measurements from the position sensor; and
    measuring flapping acceleration of the rotor blade further based on the received acceleration measurements.

15. The method of claim 11, wherein the position sensor is a microelectromechanical system (MEMS) device.

16. A flapping measurement system, comprising:
    a position sensor disposed in a rotor blade and operable to provide position measurements identifying locations of the position sensor during operation of the rotor blade; and
    a controller operable to identify flapping of the rotor blade based on a comparison of the position measurements relative to an index position of the position sensor;
    wherein the rotor blade is articulated relative to a hub to allow flapping.

17. The system of claim 16, wherein the position sensor is disposed on a zero-flapping plane of the rotor blade.

18. The system of claim 17, wherein the controller is operable to identify flapping of the rotor blade based on a comparison of the position measurements to a zero-flapping index position.

19. The system of claim 18, wherein the controller is operable to identify a flapping angle of the rotor blade based on the comparison.

20. The system of claim 17, wherein the position sensor is a microelectromechanical system (MEMS) device.

* * * * *